US008963931B2

(12) United States Patent
Fowler

(10) Patent No.: US 8,963,931 B2
(45) Date of Patent: Feb. 24, 2015

(54) TILING COMPACTION IN MULTI-PROCESSOR SYSTEMS

(75) Inventor: Mark Fowler, Hopkinton, MA (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 311 days.

(21) Appl. No.: 12/879,582

(22) Filed: Sep. 10, 2010

(65) Prior Publication Data

US 2011/0057935 A1 Mar. 10, 2011

Related U.S. Application Data

(60) Provisional application No. 61/241,151, filed on Sep. 10, 2009.

(51) Int. Cl.
G06F 15/16 (2006.01)
G06F 15/80 (2006.01)
G06F 9/50 (2006.01)
G06F 12/02 (2006.01)

(52) U.S. Cl.
CPC .......... G06F 9/5016 (2013.01); G06F 12/023 (2013.01); G06F 12/0284 (2013.01)
USPC .......................................... 345/502; 345/505

(58) Field of Classification Search
None
See application file for complete search history.

(56) References Cited

U.S. PATENT DOCUMENTS

| 5,434,968 | A | * | 7/1995 | Kunii et al. | 345/505 |
| 5,794,016 | A | * | 8/1998 | Kelleher | 345/505 |
| 5,926,644 | A | * | 7/1999 | Hays | 712/22 |
| 6,380,935 | B1 | * | 4/2002 | Heeschen et al. | 345/423 |
| 6,545,684 | B1 | * | 4/2003 | Dragony et al. | 345/531 |
| 6,956,579 | B1 | * | 10/2005 | Diard et al. | 345/537 |
| 7,075,541 | B2 | * | 7/2006 | Diard | 345/505 |
| 2006/0267989 | A1 | * | 11/2006 | Campbell et al. | 345/502 |
| 2008/0111821 | A1 | * | 5/2008 | Arora | 345/520 |
| 2010/0073371 | A1 | * | 3/2010 | Ernst et al. | 345/428 |

* cited by examiner

Primary Examiner — James A Thompson
(74) Attorney, Agent, or Firm — Volpe and Koenig, P.C.

(57) ABSTRACT

A method and system for processing a graphics frame in a multi-processor computing environment are described. Embodiments of the present invention enable the reduction of the memory footprint required for processing a graphics frame in a multi-processor system. In one embodiment a method of processing a graphics frame using a plurality of processors is presented. The method includes determining a respective assignment of tiles of the graphics frame to each processor of the plurality of processors; allocating a memory area in a local memory of each processor, where the size of the allocated memory area substantially corresponds to the aggregate size of tiles assigned to the respective processor; and storing the tiles of the respective assignment of tiles in the memory area of each respective processor.

20 Claims, 3 Drawing Sheets

TILING COMPACTION IN MULTI-PROCESSOR SYSTEMS

CROSS-REFERENCE TO RELATED APPLICATIONS

The present application claims the benefit of U.S. Provisional Appl. No. 61/241,151 filed Sep. 10, 2009, which is incorporated by reference herein in its entirety.

BACKGROUND

1. Field

Embodiments of the present invention are related to systems with multiple data processing units, and more particularly to reducing the memory footprint in graphics operations in such systems.

2. Background Art

Some graphics processing systems include multiple processing units, such as graphics processing units (GPUs), to allow for performance gains through parallel processing of graphics tasks. For example, a graphics-intensive game may be running that requires, or can benefit from, having the additional processing power provided by using multiple GPUs.

The multiple GPUs that are available in the system are used in several ways, including to process alternate frames that are being rendered (i.e. alternate frame rendering), or to process parts of the same frame. For example, when a frame requires complex processing that can be efficiently handled by both GPUs of a two GPU system concurrently processing the same frame, the CPU can distribute the same frame to both GPUs.

In some graphics processing modes, such as when multisampling is enabled, the memory footprint required for processing a frame in each GPU is substantially increased. For example, when multisampling or super sampling is used, each pixel of a frame may include multiple samples, thus significantly increasing the size of the frame data that is stored in GPU memory. The increase in the required memory footprint can lead to performance degradations due to scalability limitations, bandwidth limitations, and delays in rendering frames.

What is needed, then, are methods and systems that reduce the memory footprint required in each processor to process a frame.

BRIEF SUMMARY OF EMBODIMENTS OF THE INVENTION

Embodiments of the present invention enable the reduction of the memory footprint required for processing a graphics frame in a multi-processor system. In one embodiment a method of processing a graphics frame using a plurality of processors is presented. The method includes determining a respective assignment of tiles of the graphics frame to each processor of the plurality of processors; allocating a memory area in a local memory of said each processor, wherein the size of the allocated memory area substantially corresponds to the aggregate size of tiles assigned to the respective processor; and storing the tiles of the respective assignment of tiles in the memory area of each respective processor.

Another embodiment is an apparatus for processing a graphics frame using a plurality of processors. The exemplary apparatus includes a plurality of processors, wherein each processor is configured to allocate a memory area in a local memory of the respective processor, wherein the size of the allocated memory area substantially corresponds to the aggregate size of tiles assigned to the respective processor; and store the tiles of the respective assignment of tiles in the memory area of each respective processor.

Yet another embodiment is a computer readable media storing instructions wherein said instructions when executed are adapted to process a graphics frame using a plurality of processing units with a method. The method includes allocating a memory area in a local memory of each processing unit, wherein the size of the allocated memory area substantially corresponds to the aggregate size of tiles assigned to the respective processor; and storing the tiles of the respective assignment of tiles in the memory area of each processor.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate embodiments of the present invention and, together with the description, further serve to explain the principles of the invention and to enable a person skilled in the pertinent art to make and use embodiments of the invention.

The present invention will be described with reference to the accompanying drawings. Generally, the drawing in which an element first appears is typically indicated by the leftmost digit(s) in the corresponding reference number.

DETAILED DESCRIPTION OF EMBODIMENTS OF THE INVENTION

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

Figure 1:
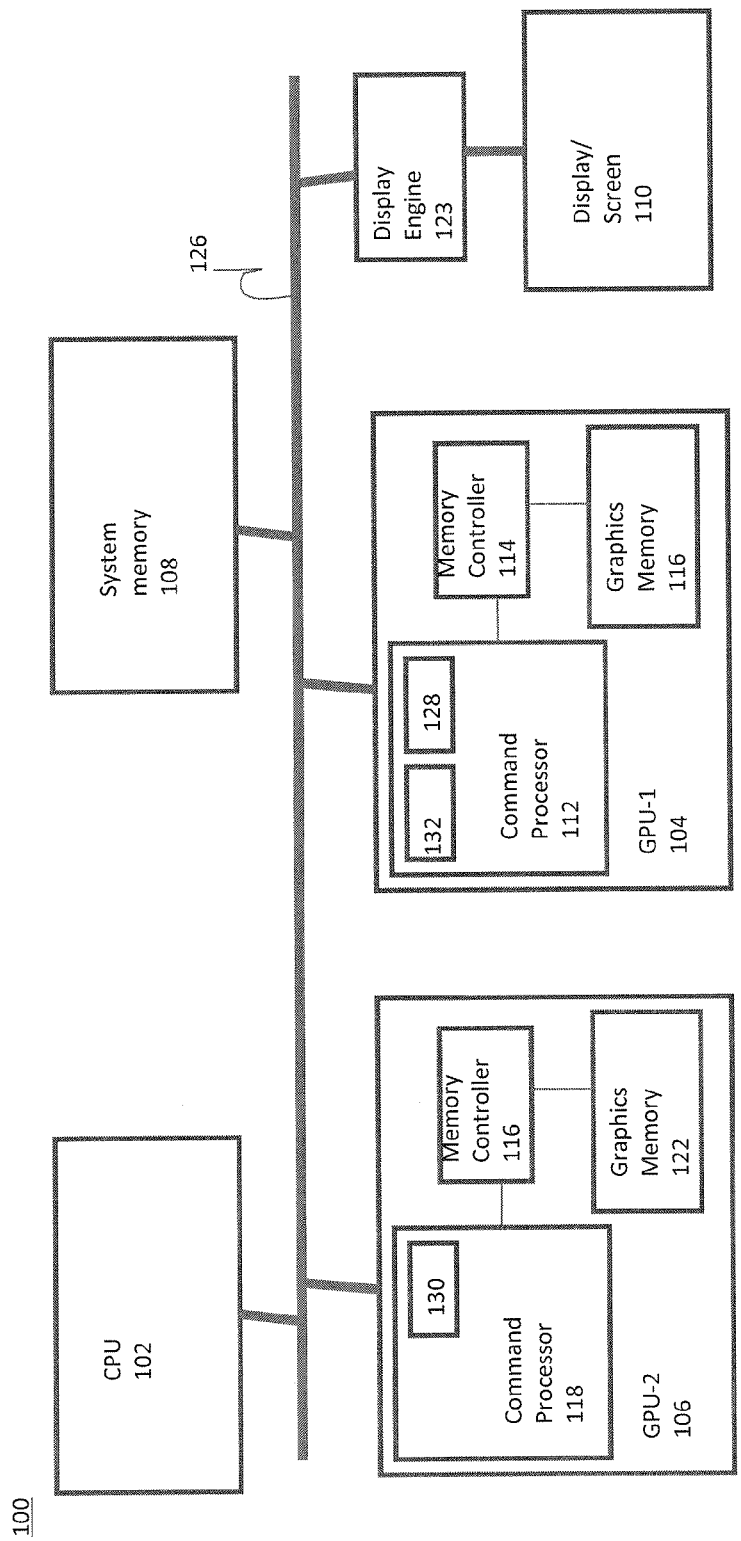
FIG. 1 shows a block diagram of a graphics computing environment, according to an embodiment of the present invention.

Graphics systems having multiple processing units, such as multiple graphics processing units (GPU), can provide enhanced performance over systems with a single GPU by allowing some graphics operations to be executed in parallel. FIG. 1 shows a multi-GPU computing environment according to an embodiment of the present invention. For example, computing environment 100 includes a central processing unit (CPU) 102 coupled to GPUs 104 and 106. As would be appreciated by those skilled in the relevant art(s) based on the description herein, embodiments of the present invention can include more than the two GPUs shown in FIG. 1. Each GPU 104 and 106 may be coupled to additional components such as memories, displays, etc. GPUs 104 and 106 receive graphics related tasks, such as graphics processing (e.g., rendering) or display tasks, from CPU 102. As will be understood by those of ordinary skill in the art, GPUs 104 and 106 may be, as illustrated, discrete components (i.e., separate devices), integrated components (e.g., integrated into a single device such as a single integrated circuit (IC), a single package housing multiple ICs, integrated into other ICs—e.g., a CPU or a northbridge) and may be dissimilar (e.g., having some differing capabilities such as, for example, performance).

GPU 104 includes command processor 112, memory controller 114 and a local graphics memory 116. Command processor 112 controls the command execution on GPU 104. For example, command processor 112 can control and/or coordinate the receiving of commands and data from CPU 102 to be processed in GPU 104. Command processor 112 can also control and/or coordinate allocation of memory in graphics memory 116, in general through memory controller 114. Memory controller 114 can control access to graphics memory 116 for the reading and writing of data.

In a manner similar to GPU 104, GPU 106 can include a command processor 118, memory controller 120, and a graphics memory 122. The functionality of command processor 118, memory controller 120, and graphics memory 122 are like that of the corresponding devices 112, 114, and 116 in GPU 104 described above.

Computing environment 100 also includes a system memory 108. System memory 108 can be used for holding the commands and data that are transferred between GPUs 104 and 106 and CPU 102. After the data is processed using graphics operations, the processed data can be written back to system memory by GPU 104 and 106. For example, in some embodiments, processed data from graphics memory 116 can be written to system memory 108 prior to be being used for further processing or for display on a screen such as screen 110. In some embodiments, frame data processed in GPU 104 and/or 106 is written to screen 110 through a display engine 123. Display engine 123 can be implemented in hardware and/or software or as a combination thereof, and may include functionality to optimize the display of data to the specific characteristics of screen 110. In another embodiment, display engine 124 can receive processed display data directly from GPU memory 116 and/or GPU memory 122.

The various devices of computing system 100 are coupled by a communication infrastructure 126. For example, communication infrastructure 126 can include one or more communication buses including a Peripheral Component Interconnect Express (PCI-E) bus of the type In an embodiment, each GPU can also include logic to determine the memory allocation to be made in its local memory based on the tiles assigned to it. For example, GPU 104 includes tile compaction logic block 128 and GPU 106 includes tile compaction logic block 130. Each tile compaction logic block can include the functionality to determine the required memory allocation for the tiles assigned to the respective GPU, to coordinate the storage of the tiles in the respective local memories according to the teachings of the present invention, and to determine the logical layout of tiles within the respective graphics memories, according to an embodiment of the present invention.

In an embodiment, one or more of the GPUs 104 or 106 can also include tile combination logic block 132. Tile combination logic block 132 includes logic to combine the tiles that are processed separately in multiple GPUs into a single frame that can be displayed on a screen or that can be transferred to system memory. In some embodiments, tile combination block 132 can access the local memory 116 of its own GPU 104 as well as local memory 122 of GPU 106 to retrieve tiles processed at each GPU separately. Tile combination block 132 may, in yet other embodiments, retrieve and export tiles from respective local memories of GPUs such that the frame can be displayed without first having to reconstitute the entire frame in a contiguous memory. It should be noted that the tile combination logic block 132 and/or its functionality can be implemented within at least one of the GPUs 104 or 106, or externally to both the GPUs. For example, the tile combination logic block 132 can be implemented in the display engine 123.

In the description above GPUs 104 and 106 have been depicted as including selected components and functionalities. A person skilled in the art will, however, understand that one or both GPUs 104 and 106 can include other components such as, but not limited to, shader engines.

Figure 2:
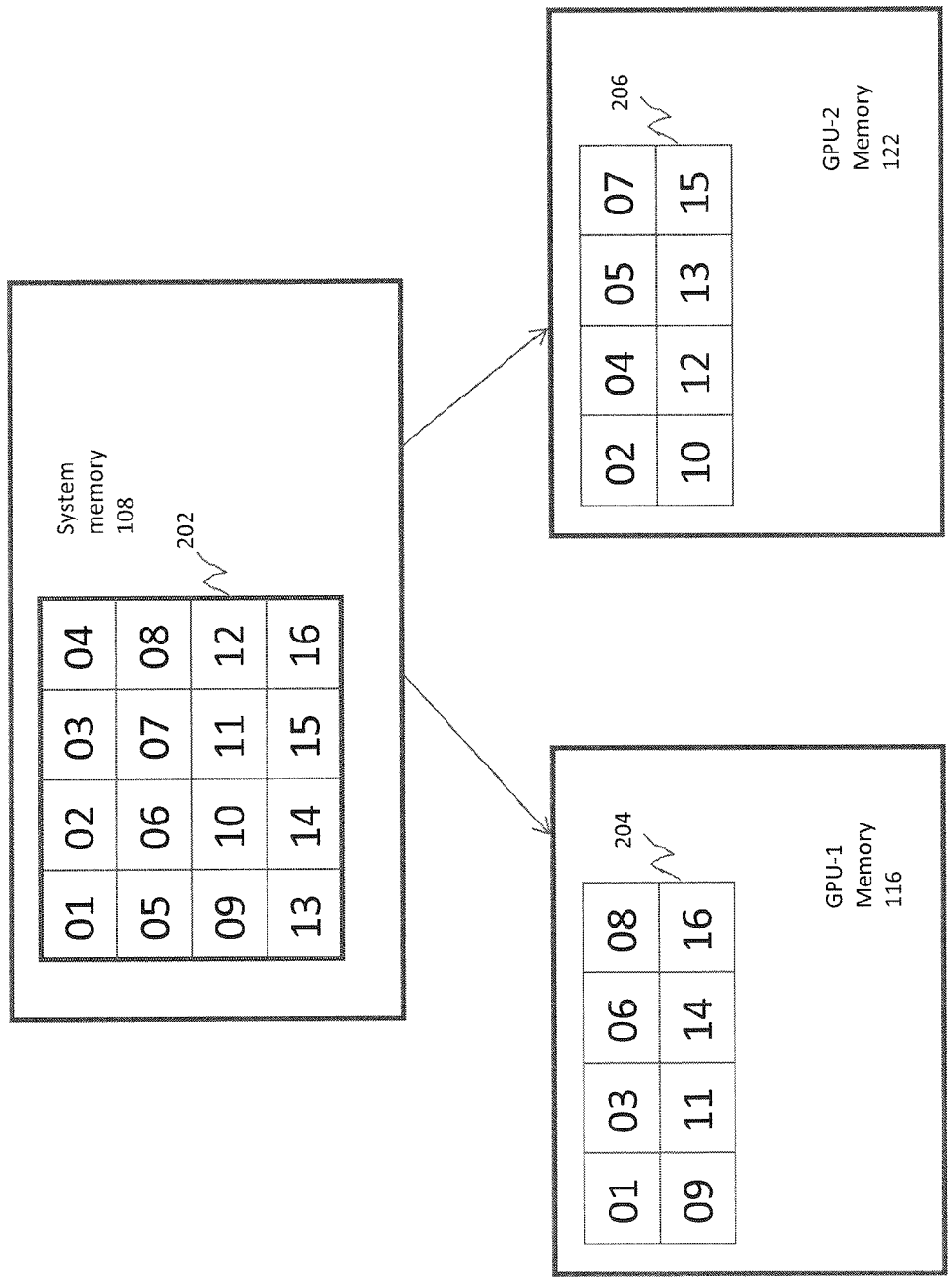
FIG. 2 shows an example tiling of a frame, according to an embodiment of the present invention.

FIG. 2 illustrates an example assignment of tiles of a frame to two GPUs, and the layout of corresponding tiles in the local memory of each GPU local memory. For example, frame 202 may be a frame output by CPU 102 to be rendered by GPUs 104 and 106 on to screen 110. Each of the small rectangles within frame 202 represents a tile. A tile can be a rectangle of any dimensions, but commonly used tile sizes are 16×16 pixels and 32×32 pixels. In the embodiment shown, CPU 102 assigns the tiles of frame 202 in a checkerboard pattern with each alternate tile being assigned to graphic memory 116 of GPU 104 and the rest of the tiles to graphic memory 122 of GPU 106.

The pattern of tile assignment may be based on various factors including the mode of display. For example, if the ultimate display of the frame 202 on screen 108 would be executed by progressively displaying tiles in a left to right and top to down pattern, then it may be advantageous to assign alternate tiles to each GPU so that the work load is temporally balanced.

FIG. 2 also shows an example of how the tiles assigned to each GPU can be logically laid out in the graphic memories 116 and 122 of GPUs 104 and 106, respectively. Frame 202 in system memory 108 is shown having 16 tiles. The tiles are illustrated with numbers ranging from 01-16 so that the example pattern of assignment can be shown conveniently. In the example shown, tiles are assigned in a checkerboard pattern to the two GPUs. Memory area 204 in graphics memory 116 in GPU 104 can have the tiles assigned to GPU 104 arranged in the manner shown (corresponding tile numbers 01-16 shown in memory areas 202, 204 and 206 represents copies of the same tile). As shown, the tiles may be arranged in a rectangular grid in a left-right top-down manner corresponding to the order of the respective tile's appearance in frame 102 among those tiles assigned to GPU 104. Likewise, memory area 204 in graphics memory 116 in GPU 104 can have the tiles assigned to GPU 104 arranged in the manner shown.

A person of skill in the art would understand that each GPU 104 and 106 can logically layout the tiles assigned to it in different patterns in its respective graphics memory. In selecting the logical tile layout pattern in local memory, the type of graphics processing or rendering may be considered. For example, some applications may allow the processing of rectangular areas comprising a grid of multiple tiles, in which case it can be advantageous to logically lay out the tiles in GPU memory in a grid pattern. In another embodiment the tiles may be logically laid out in the local memory of the GPU in a linear manner.

The logical layout of the tiles in memory is what is visible to programs executing on the respective GPU. The physical layout of the tiles in memory and the corresponding logical layout are determined by the memory controller. It is also possible, for example, that due to multiple executing programs or threads, a contiguous block of memory large enough to hold all the tiles assigned to that GPU is not available. The memory controller, for example, can include logic that still presents a logical contiguous rectangular memory area that is mapped to two or more separate (e.g., non-contiguous) areas in physical memory.

Another aspect in determining the logical layout pattern is the requirements for addressability of individual tiles. For example, the program or logic that renders the processed tiles to screen 110 may require the functionality to efficiently access and display each tile separately. Another program or logic may access and retrieve the entire set of tiles assigned to a GPU as one block. For the former program, the GPU should provide the ability to individually access each tile in its memory, while in the second program only the start address of the memory block having the tiles need be exposed to the rest of the system.

Figure 3:
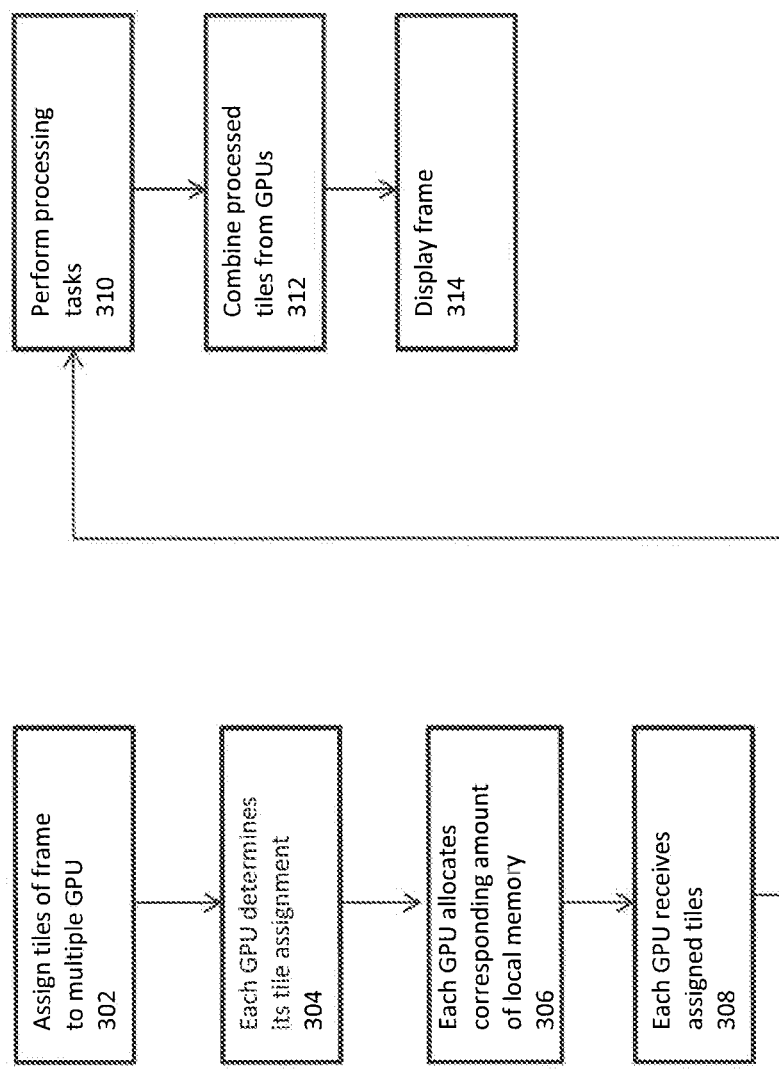
FIG. 3 is a flowchart illustrating the processing of a frame in a multi GPU system, according to an embodiment of the present invention.

FIG. 3 is a flowchart of a process that enables a frame to be processed by multiple GPUs, according to an embodiment of the present invention. In operation 302 a graphics frame is made available for processing by the multiple GPUs and an assignment of the tiles of the graphics frame to the respective GPUs is determined. For example, in processing an application, CPU 102 may form the graphics frame in system memory 108. CPU 102 can also determine an assignment of the tiles of the graphics frame to each of the available GPUs 104 and 106. As described in relation to FIG. 2 above, the choice of the pattern of assignment of the tiles may be based on various factors. In one embodiment, a checkerboard pattern is used to assign every alternate tile of a graphics frame to one GPU in a two GPU system as shown in FIG. 2.

In operation 304 each available GPU, such as GPU 104 and 106, determines the assignment of tiles to itself. For example, GPU 104 determines the number of tiles of the graphics frame assigned to it and possibly also the size of the tiles. Subsequent to forming the graphics frame to be processed in system memory 108, CPU 102 notifies GPUs 104 and 106 of the availability of the graphics frame. For example, the application code being executed on CPU 102 may invoke an application program interface (API) call of DirectX or the like to initiate processing of the graphics frame by GPUs 104 and 106.

In operation 306 each GPU determines the total memory allocation needed from its local memory. In embodiments of the present invention, the size of the needed memory allocation is determined based on the tiles assigned to it. For example, the number of tiles in the frame that are assigned to it and the size of each tile are used by GPU 104 to determine the memory allocation in its local memory 116 needed to process the graphics frame.

Having determined the size of the memory allocation necessary to process the tiles assigned to it, each GPU allocates a corresponding amount of memory in its respective local memory. The present invention enables each GPU to allocate an amount of memory not exceeding the size of the aggregate size of the tiles of the corresponding assignment of tiles to that GPU.

In operation 308, each GPU receives the tiles assigned to it from system memory. For example, having allocated the necessary amount of space in memory 116, GPU 104 receives the tiles assigned to it from system memory 108. GPU 104 may then determine how the tiles are stored in its memory 116 and how the stored tiles are presented to code executing on it or elsewhere. For example, as noted above in relation to FIG. 2, the logical layout of the tiles in memory may be determined based on a target processing application.

A key advantage of the embodiments of the present invention over conventional multi GPU systems is the use, in each GPU, of only that much memory which is needed to process the tiles assigned to it. In conventional systems, each GPU allocated the memory space required for the entire frame even though only some of the tiles within the frame were processed in a given GPU. Embodiments of the present invention enhance the scalability of the multi-GPU systems and enhance the memory footprint and memory transfer bandwidth by allocating only the memory needed for actual processing.

In operation 310, each GPU separately performs graphics processing/rendering on the tiles in its local memory.

In operation 312, the processed tiles are output as a complete processed graphics frame. Embodiments of the present invention can include the combining of tiles processed in each respective GPU at several locations. In one embodiment, one of the GPUs, for example the GPU with the lowest device ID, imports the processed tiles from the other GPUs to its own memory and combines the tiles. In another embodiment, a display device, such as display engine 124, can import processed tiles from each of respective GPU and combine them in a memory local to the display engine or in system memory. In yet another embodiment, a display device, such as display engine 124, can read processed tiles from the respective memories of the GPUs such that the frame can be rendered to a screen without having to reconstitute the entire frame in a memory. In still another embodiment of the present invention, the GPUs have access to each other's memory and therefore can perform tasks such as the combining of the tiles without having to reconstitute the entire frame in the memory of one GPU.

The retrieval of the tiles from each GPU is affected by the manner in which memory for the tiles is allocated in each GPU, how the tiles are logically laid out in each GPU, and requirements of the application. As noted in relation to FIG. 2, the logical layout of the tiles in the GPU memory can be based on the applications, or more specifically the tile retrieval patterns of applications.

In operation 314, the processed graphics frame that was reconstituted from the processed tiles is displayed in a display such as display screen 110. In another embodiment, the reconstituted frame can be copied to system memory 108 and be used for further processing.

Instructions executed by the logic to perform aspects of the present invention can be coded in a variety of programming languages, such as C and C++, Assembly, and/or a hardware description language (HDL) and compiled into object code that can be executed by the logic or other device.

The embodiments described above can be described in a hardware description language such as Verilog, RTL, netlists, etc. and that these descriptions can be used to ultimately configure a manufacturing process through the generation of maskworks/photomasks to generate one or more hardware devices embodying aspects of the invention as described herein.

Aspects of the present invention can be stored, in whole or in part, on a computer readable media. The instructions stored on the computer readable media can adapt a processor to perform embodiments of the invention, in whole or in part.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

While various embodiments of the present invention have been described above, it should be understood that they have been presented by way of example only, and not limitation. It will be apparent to persons skilled in the relevant art that various changes in faun and detail can be made therein without departing from the spirit and scope of the invention. Thus, the breadth and scope of the present invention should not be limited by any of the above-described exemplary embodiments, but should be defined only in accordance with the following claims and their equivalents.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

What is claimed is:

1. A method comprising:
    assigning a first set of respective tiles within a graphics frame to a first processor;
    assigning a second set of the respective tiles within the graphics frame to a second processor, wherein a size of the first set is different than a size of the second set;
    dynamically adjusting size of first and second memory allocations in respective first and second local memories of the first and second processors such that the sizes of the first and second memory allocations are different and are based on the size of the first and second sets of respective tiles; and
    storing the first and second sets of respective tiles in the first and second memory allocations of the first and second local memories, respectively.

2. The method of claim 1, wherein the storing comprises:
    logically mapping the first and second sets of respective tiles to the first and second memory allocations based on a predetermined address mapping scheme.

3. The method of claim 1, further comprising:
    processing the stored tiles in the respective first and second memory allocations of the first and second processors;
    transferring the processed tiles from the first and second memory allocations of the first and second processors to a system memory; and
    displaying a processed graphics frame, wherein the processed graphics frame comprises the processed tiles from the first and second processors.

4. The method of claim 3, wherein the transferring comprises:
    accessing the processed tiles by addressing each of the processed tiles individually; and
    copying the processed tiles individually to the system memory, wherein each of the processed tiles from the first and second processors are arranged according to a position of the corresponding tile in the processed graphics frame.

5. The method of claim 3, wherein the transferring comprises:
    accessing the processed tiles in a single memory access;
    identifying individual tiles in the processed tiles; and
    copying the individual tiles to the system memory, such that each of the individual tiles is arranged in the system memory according to a position of the corresponding tile in the processed graphics frame.

6. The method of claim 1, further comprising:
    processing the stored tiles in the respective first and second local memories of the first and second processors; and
    displaying a processed graphics frame in a display without combining, in a contiguous memory, the processed tiles from the first and second processors, wherein the processed graphics frame comprises the processed tiles from the first and second processors.

7. The method of claim 6, wherein the displaying the processed graphics frame comprises:
    retrieving the processed tiles respectively from the first and second local memories by the first processor; and
    displaying the retrieved tiles.

8. The method of claim 7, wherein the retrieving comprises:
    accessing the processed tiles by addressing each of the processed tiles individually.

9. The method of claim 1, wherein the first processor and the second processor comprise a first graphics processing unit and a second graphics processing unit.

10. An apparatus comprising:
    a first processor and a second processor configured to:
        assign a first set of respective tiles within a graphics frame to the first processor;
        assign a second set of respective tiles within the graphics frame to the second processor, wherein a size of the first set is different than a size of the second set;
        dynamically adjusting size of first and second memory allocation in respective first and second local memories of the first and second processors such that the sizes of the first and second memory allocations are different and are based on the size of the first and second sets of respective tiles; and
        store the first and second sets of respective tiles in the first and second memory allocations of the first and second local memories, respectively.

11. The apparatus of claim 10, further comprising:
    a central processor unit coupled to the first and second processors,
    wherein the central processor unit is configured to perform the assigning of the respective tiles.

12. The apparatus of claim 10, wherein the first processor is further configured to:
    retrieve the assigned respective tiles from the first and second local memory allocations; and
    transmit the retrieved tiles for displaying without combining, in a contiguous memory, the retrieved tiles from the first and second processors.

13. The apparatus of claim 10, further comprising:
    a tile combination logic block coupled to at least one of the first and second processors, wherein the tile combination logic is configured to transfer the stored tiles from the first and second local memory allocations to a system memory.

14. The apparatus of claim 13, wherein the tile combination logic block is further configured to:
    access the stored tiles by addressing each of the stored tiles individually; and
    copy the accessed tiles individually to the system memory, wherein each of the accessed tiles from the first and second processors is arranged according to a position of the corresponding tile in the graphics frame.

15. The apparatus of claim 13, wherein the tile combination logic block is implemented external to the first and second processors.

16. The apparatus of claim 10, wherein the first processor and the second processor comprise a first graphics processing unit and a second graphics processing unit.

17. A non-transitory computer readable media storing instructions wherein the instructions when executed are adapted to process a graphics frame with a method comprising:
- assigning a first set of respective tiles within the graphics frame to a first processor;
- assigning a second set of respective tiles within the graphics frame to a second processor, wherein a size of the first set is different than a size of the second set;
- dynamically adjusting sizes of first and second memory allocations in respective first and second local memories of the first and second processors such that the sizes of the first and second memory allocations are different and are based on the size of the first and second sets of respective tiles; and
- storing the first and second sets of respective tiles in the first and second memory allocations of the first and second local memories, respectively.

18. The non-transitory computer readable media of claim 17 wherein the instructions comprise hardware description language instructions.

19. The non-transitory computer readable media of claim 18 wherein the instructions are adapted to configure a manufacturing process through generation of maskworks/photomasks to generate a device for processing the graphics frame.

20. The non-transitory computer readable media of claim 17, wherein the first processor and the second processor comprise a first graphics processing unit and a second graphics processing unit.

\* \* \* \* \*